United States Patent [19]

Solaroli

[11] Patent Number: 4,521,863
[45] Date of Patent: Jun. 4, 1985

[54] GAUGE FOR CHECKING THE CLEARANCE EXISTING BETWEEN THE CAMS OF A CAMSHAFT AND THE RELEVANT VALVES

[75] Inventor: Sergio Solaroli, Bologna, Italy

[73] Assignee: Finike Italiana Marposs S.p.A., S. Marino di Bentivoglio, Italy

[21] Appl. No.: 396,894

[22] Filed: Jul. 9, 1982

[30] Foreign Application Priority Data

Jul. 17, 1981 [IT] Italy ................................. 3481 A/81

[51] Int. Cl.³ .......................... G01B 7/14; F01L 1/20; G01M 15/00
[52] U.S. Cl. ............................ 364/561; 33/180 AT; 33/181 AT; 73/118; 73/119 R; 123/90.52; 364/550; 364/563
[58] Field of Search ............... 364/550, 551, 561, 562, 364/563; 33/180 AT, 181 AT, 185 V; 73/119 R, 118; 123/90.52

[56] References Cited

U.S. PATENT DOCUMENTS

| 2,278,710 | 4/1942 | Orr | 33/181 AT |
| 3,988,925 | 11/1976 | Seccombe et al. | 33/180 AT |
| 4,295,301 | 10/1981 | Barth et al. | 364/550 X |

FOREIGN PATENT DOCUMENTS 769590 3/1957 United Kingdom .

OTHER PUBLICATIONS

Patents Abstracts of Japan, vol. 6, No. 74, (M-127) (1952), JP-A-57-13205.

Primary Examiner—Errol A. Krass
Assistant Examiner—Kevin J. Teska
Attorney, Agent, or Firm—Stevens, Davis, Miller & Mosher

[57] ABSTRACT

A gauge for measuring the clearance between a cam of an engine camshaft and the relevant valve, during rotation of the camshaft, comprises a first movable feeler element, for contacting the cam profile, and a second movable feeler element, for contacting a surface, facing the cam, of the valve or of an element coupled to the valve. A retraction device can displace the second feeler element from a rest position to an operating position. Gauging heads provide a signal depending on the mutual position of the first and second feeler elements and a processing circuit processes these signals to obtain the clearance.

13 Claims, 13 Drawing Figures

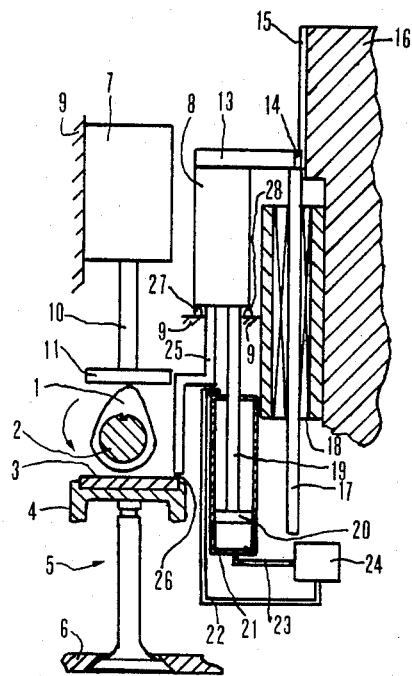
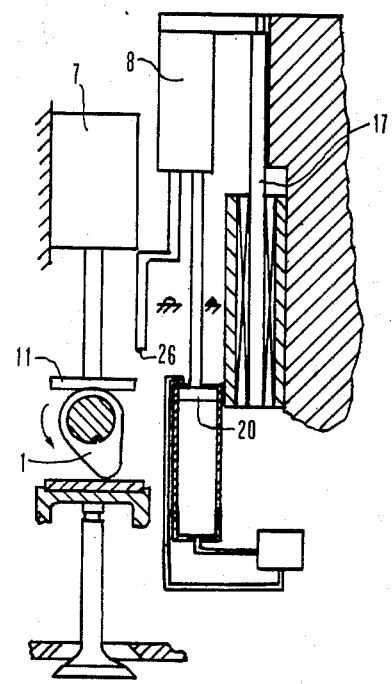
FIG.1A  FIG.1B
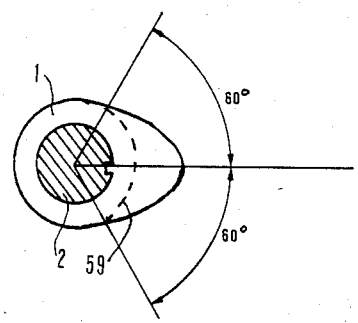
FIG.3

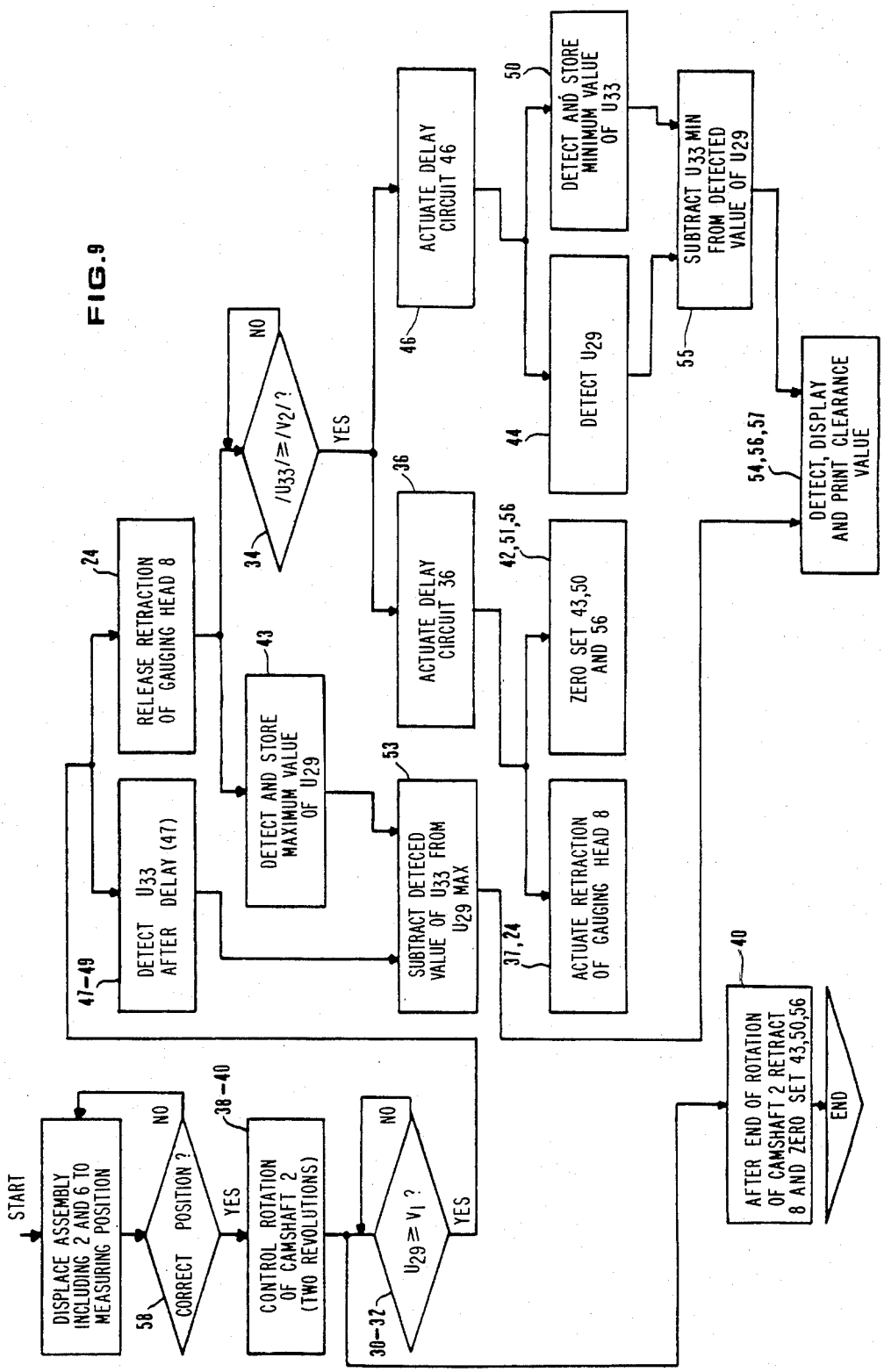

GAUGE FOR CHECKING THE CLEARANCE EXISTING BETWEEN THE CAMS OF A CAMSHAFT AND THE RELEVANT VALVES

The present invention relates to a gauge for checking the clearance existing between the cams of a camshaft of an engine and the relevant valves, including support means, gauging means for determining, during the camshaft rotation, the mutual position of the cam surface and of the valve, processing means connected to the gauging means for determining the amount of clearance, and control means.

BACKGROUND OF THE INVENTION

According to a known constructional feature employed in the automobile engines with bucket type tappets, for ensuring the correct performance of the opening and closure phases of valves there is foreseen the insertion—in the valve cups—of shims that have such a thickness as to provide a predetermined amount of clearance between the shims and the base circles of the cams.

Conventional gauges are also known, which determine the thickness of the shims in the course of the assembly of an engine, by measuring the clearances when the camshaft and the valves are already assembled. According to this method there are measured the lifts of the valves and relevant cams during a complete rotation of the camshaft and the thicknesses of the shims are determined by calculating the differences between the lifts of the valves and the lifts of the corresponding cams. In these known gauges the valve lifts are detected by feelers that cooperate with the bases of the valve heads and the lifts of the cams by other feelers, aligned with the previous ones, that cooperate with the surfaces of the cams.

A considerable inconvenience occuring in these known gauges derives from the fact that under normal circumstances the bases of the valve heads are not machined with accuracy and consequently are not reliable references.

A further inconvenience is due to the fact that these gauges can be applied only when the engine is in an assembling phase according to which the bases of the valve heads are accessible; in other words, before assembling of the cylinder head on the engine block.

SUMMARY OF THE INVENTION

The technical problem that the present invention intends to solve is that of providing a gauge that is not subject to the inconveniences of the known gauges, that guarantees accurate measurements, has greater possibilities of use and at the same time is simpler and less expensive as compared to the conventional gauges.

This object is attained through a gauge of the type outlined at the beginning of this description wherein, according to the invention, the gauging means include an element adapted to cooperate with the part of the valve facing the cam, or with a surface, facing the cam, of a member associated with the valve, more particularly with the base of the valve cup or with a face of a valve shim.

Generally the accessibility of the cup base or of the shim face facing the cam is problematical because the diameter of the cup base and that of the shim are normally smaller than the diameter of the circle described by the tip of the cam lobe.

According to another feature of the invention, the control means are connected to the element for controlling its displacement from a rest position to a measurement position, and vice versa.

BRIEF DESCRIPTION OF THE DRAWINGS

The invention is described in more detail with reference to the accompanying drawings, given by way of non-limiting example, in which identical or equivalent parts are indicated with the same reference numbers, and in which:

FIGS. 1A and 1B are schematic elevation views, partly in cross-section, of the mechanical part of a gauge, according to a first embodiment of the invention, in two different working phases;

FIG. 3 shows a type of cam of a camshaft, and indicates the base circle and the angular distances of the various sections of the cam contour surface;

FIGS. 8A and 8B are diagrams that show some elements of two gauges, partly similar to that shown in FIGS. 5 to 7, at two checking phases for determining the amounts of clearances existing between cams and associated valves;

and FIG. 9 is a flow chart illustrating the operational procedure of the invention according to the embodiment of FIGS. 1A, 1B, 2, 3, and 4.

DESCRIPTION OF THE PREFERRED EMBODIMENTS

Figure 2:
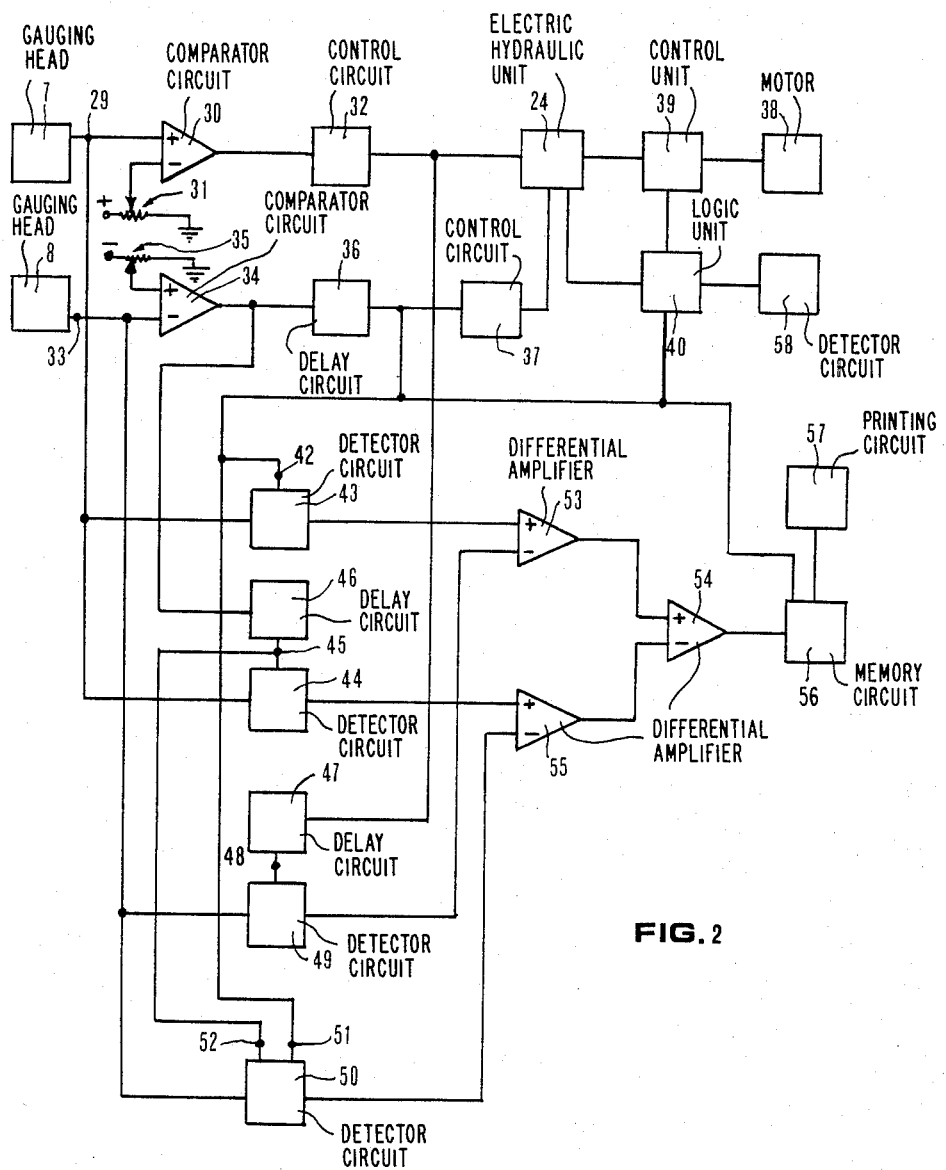
FIG. 2 is a block diagram of the control, processing and the display circuits of the gauge shown in FIGS. 1A and 1B.
Figure 4:
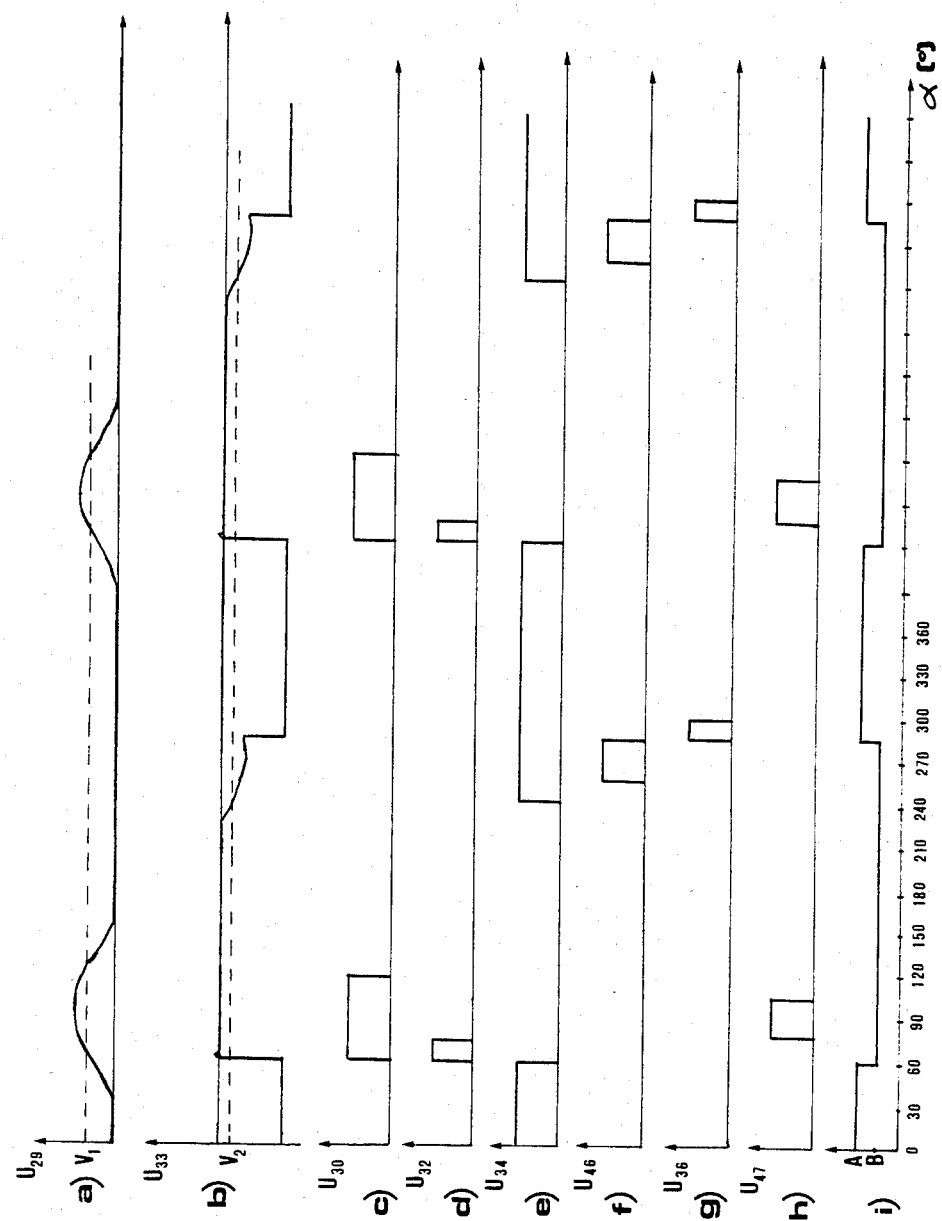
FIG. 4 shows eight timing diagrams, to illustrate the operation of the gauge of FIGS. 1A, 1B and 2.

The gauge shown in FIGS. 1A and 1B is at two distinct phases of the measuring cycle for determining the clearance existing between a cam 1 of an overhead camshaft 2 and the register shim 3 inserted in cup 4 of valve 5 of a 4-stroke automobile engine with bucket type tappets. Valves 5 include other elements, such as valveguides and the return springs, that are not shown in FIGS. 1A and 1B for simplicity's sake.

As it will become apparent from the following description, the gauge is capable of measuring the amount of clearance in an engine assembly phase according to which camshaft 2 and valves 5 with their associated shims 3 have already been assembled and cylinder head 6 has been fixed to the cylinder block (not shown).

The gauge includes two electronic gauging heads 7 and 8 that have rather broad measuring ranges. Gauging head 7 has a casing coupled to frame 9 of the gauge and it includes stylus 10, axially movable in a vertical direction, which carries, at its end arranged outside the gauging head casing, a feeler element or contact 11 that has a shoe shape. Feeler element 11 cooperates with the contour of cam 1 during the rotation of camshaft 2 about an axis defined by supports of camshaft 2 located in cylinder head 6.

in the abscissa lines there are indicated angles α, in degrees, of the counterclockwise rotation of cam 1 starting from the position shown in FIG. 3.

Diagram (a) shows the output signal $U_{29}$ of gauging head 7, diagram (b) shows the output signal $U_{33}$ of gauging head 8, diagram (c) indicates the output signal $U_{30}$ of comparator circuit 30, diagram (d) indicates the output signal $U_{32}$ of control circuit 32, diagram (e) the output signal $U_{34}$ of comparator circuit 34, diagram (f) the output signal $U_{46}$ of delay circuit 46, diagram (g) the output signal $U_{36}$ of delay circuit 36, diagram (h) the output signal $U_{47}$ of delay circuit 47, and diagram (i) the positions A (up) and B (down), respectively of FIGS. 1B and 1A of gauging head 8.

The reference voltage applied to the inverting terminal of comparator circuit 30 is indicated in diagram (a) with $V_1$ and that applied to the non-inverting terminal of comparator circuit 34 is indicated with $V_2$ in diagram (b). In diagram (c) it can be realized that comparator circuit 30 switches for the following (approximate) values of α:60°, 120°, 420°, 480°.

At the raising edges of $U_{30}$, control circuit 32 provides a signal that activates the electro-hydraulic unit 24 and causes releasing of the retraction in such a way that gauging head 8 passes from the rest to the measurement position. Correspondingly the signal of gauging head 8 passes—through a short transient—from a fixed negative value (due to the fact that in the rest position stylus 25 is displaced downwards of a maximum entity, with respect to the casing of gauging head 8) to a value indicative of the position of shim 3 under the conditions shown in FIG. 1A (for 60°<α≦210° valve 5, owing to the action of its return springs, is located in the closure position). For α≅90° and α≅450° the maximum value detecting circuit 43 detects and memorizes the maximum value of the output signal of gauging head 7. Moreover the raising edges of the output signal $U_{32}$ of control circuit 32 actuate delay circuit 47 that enables detector circuit 49. Detector circuit 49 updates to the corresponding value of gauging head 8 signal (for α≅90° and α≅450°).

The contacting of the lobe of cam 1 with shim 3 occurs with a slight delay after that α has reached the value 210°. The amount of delay depends on the unknown to be determined, i.e. on the amount of clearance.

Cam 1, by continuing its rotation, pushes shim 3 downwards until reaching a maximum entity (α≅270°). Correspondingly, the output signal of gauging head 8 has negative values and for α≅240° comparator circuit 34 switches. The same occurs for α≅600°. The raising edges corresponding to the switching of comparator circuit 34 actuate delay circuit 36 that provides, with a certain amount of delay Δα(≅45°), a control for the actuation of the retraction of gauging head 8. The output signal of delay circuit 36 is also used for zerosetting the maximum value detecting circuit 43, the minimum value detecting circuit 50, and memory circuit 56. Within the lapse of time between the raising edge corresponding to switching of comparator circuit 34 and the actuation of the retraction, delay circuit 46, actuated by comparator circuit 34, provides an enabling signal to detecting circuit 44 and detecting circuit 50.

Detecting circuit 44 then detects (α≅270°) the signal of gauging head 7 due to the contacting of feeler element 11 with the surface of cam 1 corresponding to the base circle and detecting circuit 50 detects the minimum value of the signal of gauging head 8, corresponding to the maximum lowering of shim 3.

Differential amplifier 53 provides at its output the following signals $[U_{29MAX}(α≅90°)-U_{33}(α≅90°)]$ and, subsequently, $$[U_{29MAX}(α≅450°)-U_{33}(α≅450°)].$$

Differential amplifier 55 provides at its output the following signals $[U_{29}(α≅270°)-U_{33MIN}(α≅270°)]$ and, subsequently, $$[U_{29}(α≅630°)-U_{33MIN}(α≅630°)].$$

Correspondingly differential amplifier 54 provides at its output the following signals indicative of the amount of clearance:

$$[U_{29MAX}(α≅90°)-U_{33}(α≅90°)]-[U_{29}(α≅270°)-U_{33MIN}(α≅270°)]$$

and (subsequently):

$$[U_{29MAX}(α≅450°)-U_{33}(α≅450°)]-[U_{29}(α≅630°)-U_{33MIN}(α≅630°)].$$

Thus the amount of clearance is shown and printed by display and printing unit 57.

Control unit 39 makes motor 38 and camshaft 2 rotate for two revolutions so as to guarantee the detection of clearance whichever the initial angular position of cam 1 may be.

When motor 38 stops rotating, logic unit 40 controls the retraction of gauging head 8 and the zerosetting of detecting circuits 43, 50 and memory circuit 56.

The gauge is also equipped with safety devices and circuits, not shown in the drawings for simplicity's sake, so as to prevent or interrupt the actuation of motor 38 in the case any malfunctions occur.

The gauge shown in FIGS. 1A, 1B and 2 can also be utilized for determining the amount of clearance existing between cam 1 and the upper surface of cup 4, so as to select a shim 3 with a suitable thickness that is thereafter inserted after having dismantled cylinder head 6 or, if the type of valve allows it, by appropriate tools.

Obviously, in order that the hereindescribed gauge may be used it is necessary that the diameter of shim 3 or of the relevant resting surface of cup 4 be slightly larger than that of the circle base of cam 1. The diameter of shim 3 can however be smaller than the diameter of the circle described by the tip of the lobe of cam 1.

Figure 5C:
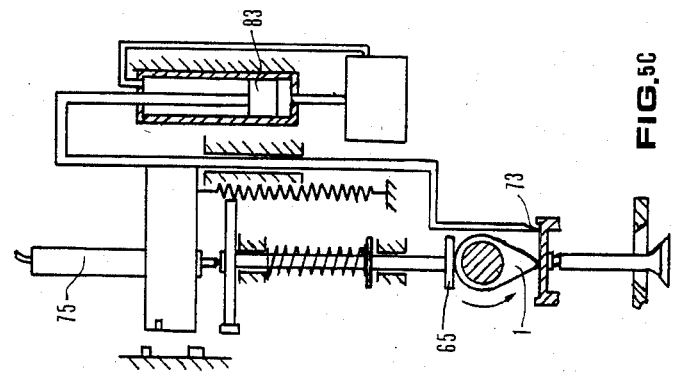
FIGS. 5A, 5B, 5C are schematic elevation views, partly in cross-section, of the mechanical part of a gauge according to the preferred embodiment of the invention, in three different working phases.
Figure 5B:
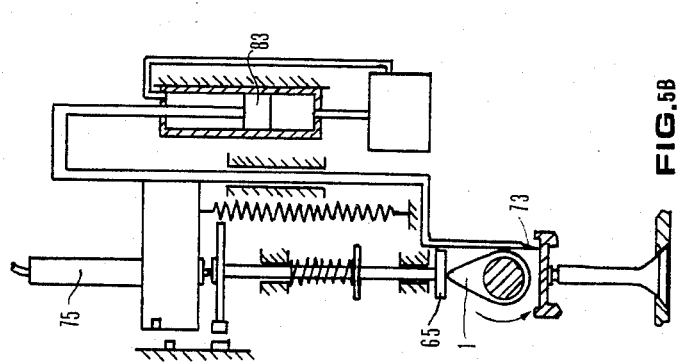
Figure 5A:
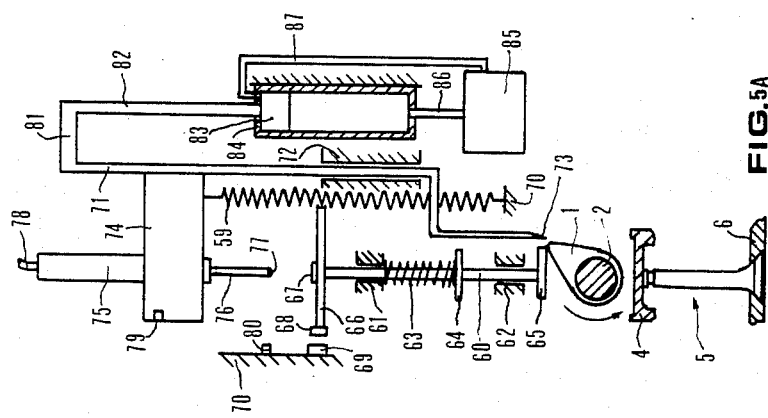

The gauge illustrated in FIGS. 5A, 5B and 5C is shown in three different phases of a cycle for checking the clearance existing between a cam 1 and the upper resting surface of the cup 4 of a valve 5 (wherein there has not yet been inserted the register shim).

The gauge includes a spindle 60 guided in a vertical direction by two bushings 61 and 62 and subjected to the action of a compression spring 63 that has its ends cooperating with a base of bushing 61 and with a limit stop 64 coupled to spindle 60. There is moreover foreseen a device, not shown, for preventing rotational movements of spindle 60 about its axis.

Spindle 60 bears at its lower end a feeler element or contact 65 with a shoe shape, that, owing to the thrust of spring 63, remains in contact with the contour of cam 1. At its upper end, spindle 60 carries a plate 66 with a reference abutment 67. At a side of plate 66 there is fixed a first member 68 of a unidirectional proximity switch, that includes a second member 69 coupled to a support frame 70 of the gauge. To frame 70 there are also coupled bushings 61 and 62.

A second spindle 71, also vertically movable, is guided by a bushing 72 fixed to frame 70 and is coupled to a device—not shown—that prevents it from rotating about its axis.

Spindle 71 bears at its lower end a feeler element or contact 73 that can contact the upper base of cup 4, i.e. the resting surface of a register shim, to be selected depending on the thickness required.

Spindle 71 is coupled to a horizontal crosspiece 74 to which there is fixed an electronic gauging head 75 including a stem or axially movable stylus 76, that carries at an end a feeler element 77 that can contact reference abutment 67.

To gauging head 75 there is connected a power supply and output cable 78.

A first member 79 of a second unidirectional proximity switch is fixed to a side of crosspiece 74. The second member 80 of this switch is fixed to frame 70.

Spindle 71 is coupled, by means of a horizontal arm 81, to rod 82 of a piston 83 vertically movable within a hydraulic cylinder 84, fixed to frame 70. An electro-hydraulic unit 85 is connected by means of pipings 86 and 87 to cylinder 84.

A traction spring 59 coupled to crosspiece 74 and frame 70, tends to pull spindle 71 downward.

Figure 6:
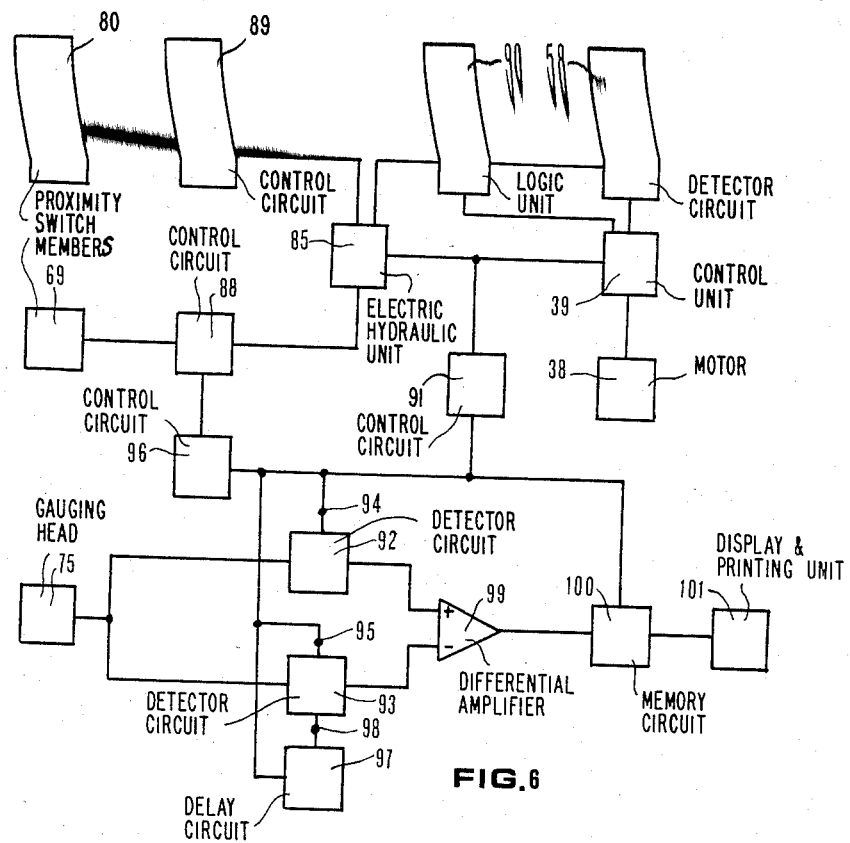
FIG. 6 is a block diagram of the control, processing and display circuits of the gauge shown in FIGS. 5A, 5B and 5C.

With reference to FIG. 6, the member 69 of the above mentioned unidirectional proximity switch is connected to the input of a control circuit 88 whose output is connected to electro-hydraulic unit 85.

Member 69 is energized when spindle 60, by moving upwards, carries member 68 next to member 69. Control circuit 88 then provides to electro-hydraulic unit 85 a control signal which causes electro-hydraulic unit 85 to actuate cylinder 84 so as to allow the lowering of spindle 71 from the position shown in FIG. 5A to that of FIG. 5B, unitl feeler element 73 contacts that resting surface of cup 4 ("retraction release" control). Under these conditions the electro-hydraulic unit 85 also allows the further lowering of spindle 71 until it reaches the position shown in FIG. 5C by the action of spring 59.

Member 80 of the second unidirectional proximity switch is connected to the input of a control circuit 89 whose output is connected to electro-hydraulic unit 85. Member 80 is energized when spindle 71, by moving upwards, brings member 79 next to member 80. This displacement of spindle 71, due to the contacting of feeler element 73 with the resting surface of cup 4 and to the raising of the latter, is not prevented by electro-hydraulic unit 75 and by cylinder 84 and piston 83 device. Control circuit 89 then provides a control signal to electro-hydraulic unit 85, owing to which electro-hydraulic unit 85 sends oil through piping 86, causing spindle 71 to raise from a position next to the one shown in FIG. 5C to the position shown in FIG. 5A ("retraction" control).

A logic unit 90 is connected to electro-hydraulic unit 85, and to components already described with reference to FIG. 2, namely a detecting circuit 58 and a control unit 39 connected to a motor 38.

Control unit 39, enabled by circuit 58, causes motor 38 to rotate at a constant speed so as to make camshaft 2 perform two counterclockwise rotations. A zerosetting control circuit 91 is connected to control unit 39 to detect the stopping of motor 38.

Gauging head 75 has its output connected to two maximum value detecting circuits 92 and 93. These circuits 92 and 93 have terminals 94 and 95 for zerosetting control connected to the output of control circuit 91 and the output of another zero setting control circuit 96 having the input connected to control circuit 88.

A delay circuit 97 has its input connected to the output of circuit 96 and its output connected to an enabling terminal 98 of the maximum value detecting circuit 93.

The outputs of the maximum value detecting circuits 92 and 93 are connected to the non-inverting input and the inverting input of a differential amplifier 99 respectively.

A memory circuit 100 receives at an input the output signal from the differential amplifier 99 and has a zerosetting terminal connected to the outputs of the zerosetting control circuits 91 and 96.

A display and printing unit 101 is connected to memory circuit 100.

Figure 7:
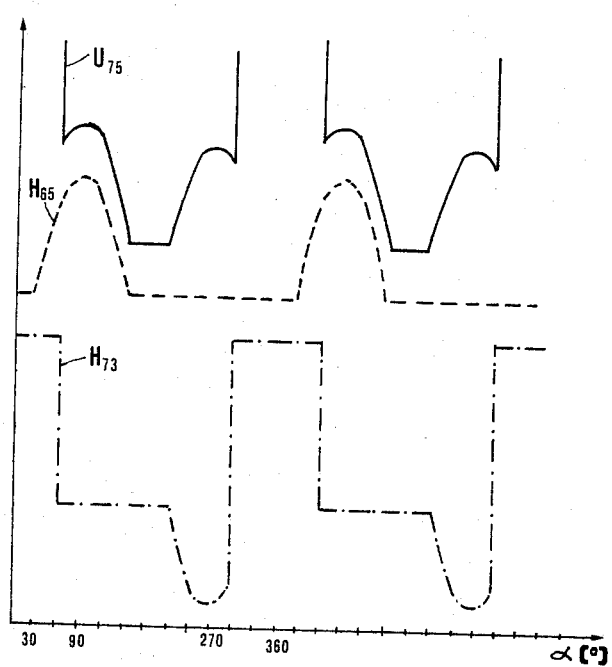
FIG. 7 shows three diagrams that illustrate the operation of the gauge of FIGS. 5A, 5B, 5C and 6.

The functioning of the gauge shown in FIGS. 5 and 6 may be better understood with the aid of the diagrams shown in FIG. 7, where in the abscissa line there are shown angles $\alpha$ in rotational degrees of camshaft 2 starting from a position corresponding to that of cam 1 shown in FIG. 3, and in the ordinate line there are shown positions, i.e. displacements.

The dashed curve $H_{65}$ indicates the positions of feeler element 65, the dotted and dashed curve $H_{73}$ indicates the positions of feeler element 73 and the non interrupted curve $U_{75}$ indicates the output signal of gauging head 75, i.e. the position or distance of feeler element 77 with respect to the casing of gauging head 75.

Initially ($\alpha=0°$), when motor 38 starts to make camshaft 2 rotate in a counterclockwise direction, gauging head 75 is in a retracted position and feeler element 73 does not contact the upper base of cup 4. Feeler element 65 contacts the contour of cam 1 corresponding to the base circle. Subsequently ($\alpha \cong 30°$) feeler element 65 is progressively raised upwards by the lobe of cam 1. When ($\alpha \cong 60°$) member 68 moves next to member 69, member 69 is energized and thus the releasing of gauging head 75 is controlled. Gauging head 75 is moved from the position shown in FIG. 5A to that of FIG. 5B. Gauging head 75 then provides a signal depending on the axial distance of feeler element 65 from feeler element 73.

This signal reaches a first maximum value for $\alpha \cong 90°$ (FIG. 5B). This maximum value signal is detected by detecting circuit 92, that had previously been zeroset by control circuit 96 at the moment when gauging head 75 had been released.

In the meantime feeler element 73 remains in touch with the surface of cup 4, that does not move. Thereafter feeler element 65 progressively moves downwards until it touches the contour of cam 1 corresponding to the base circle. Delay circuit 97 then sets to zero the maximum value detecting circuit 93.

Then the lobe of cam 1 contacts the resting surface of cup 4 and forces the latter to lower, opposing to the thrust of the spring, or springs, of valve 5.

For $\alpha \cong 270°$ (FIG. 5C) feeler element 73 reaches its utmost down position and the signal of gauging head 75 reaches a new maximum value differing from the previous maximum value since, unlike the condition shown in FIG. 5B, between cam 1 and cup 4 there is no clearance.

This second maximum value is detected by detecting circuit 93 and the difference between the two maximum values, detected by differential amplifier 99, is memorized by circuit 100, that had previously been zero set by control circuit 96.

Cam 1 further rotates and cup 4 progressively raises, moving upwards feeler element 73 and crosspiece 74 until ($\alpha \cong 300°$) member 79 is displaced next to member 80. Member 80 is then energized and this enables the retraction control of gauging head 73, that raises thus returning to the position shown in FIG. 5A.

Cam 1 can therefore continue its rotation without the danger that the lobe of the cam may touch spindle 71.

In the course of the second revolution of cam 1 the functioning phases repeat in the same way, owing to the assumed initial position of cam 1.

The two gauges described with reference to FIGS. 1-4 and 5-7 are able to check the clearance between a cam 1 and its associated valve 5 within 20-30 seconds.

It is obvious that should all the cams and associated engine valves require checking, two main alternatives can be followed.

According to a first solution of the problem there is employed just one gauge for effecting in sequence the various checking cycles by shifting the gauge to the different valves and cams. This solution which is relatively cheap, involves altogether a considerable checking time.

The second solution, that is technically preferable, but more expensive, foresees the use of just as many checking gauges as the pairs of cam-valve to be checked, in order to simultaneously carry out each check.

With reference to the diagrams shown in FIGS. 8A and 8B there is now described the simultaneous application of two distinct gauges for checking the clearance of two opposite cams 1' and 1" of a camshaft 2. In the upper part of FIG. 8A there is shown a first section of camshaft 2 and some component parts of the first gauge. In the lower part of FIG. 8A there are shown a second section of camshaft 2 and some component parts of the second gauge.

FIG. 8B is similar to FIG. 8A, but it refers to different moments of the relevant operating cycles of the two gauges.

The two gauges are basically similar to that described with reference to FIGS. 5-7, but show some differences, as the measurement and control signals provided by one of the gauges are used for controlling the other gauge.

For a better understanding, FIGS. 8A and 8B show just the main variants of the two gauges with respect to the contructional features shown in FIGS. 5-7.

The two gauges include associated feeler elements 65' and 65" that contact the contour of the two opposite cams 1' and 1" of camshaft 2. The camshaft 2 in the course of the checking operation, is made to rotate in a clockwise direction for two revolutions, by a motor that is not shown in the drawings.

Two "retraction" units 102 and 102' are connected to spindles 71' and 71"; two control units 103 and 103', including for example unidirectional proximity switches, can provide control signals on condition that spindles 71' and 71" reach prefixed positions.

Two other control units 104, 104', also including unidirectional proximity switches, can provide control signals on condition that feeler elements 65' and 65" reach prefixed positions. The control units 103 and 103", as well as control units 104 and 104" are respectively connected to retraction units 102' and 102.

Control unit 104' provides a control signal in the functioning phase shown in FIG. 8A and this signal activates retraction unit 102 that controls the "retraction" of spindle 71', so avoiding that the lobe of cam 1' touches, when continuing the clockwise rotation of shaft 2, spindle 71'.

Control unit 103' provides a control signal in the functioning phase shown in FIG. 8B and this signal actuates again retraction unit 102 that controls the release of spindle 71'.

In the same way control units 103 and 104 of the first gauge activate unit 102' of the second gauge.

The other operating phases of the two gauges shown in FIGS. 8A and 8B are inferable from the previous description relating to FIGS. 5-7.

It is obvious that the described embodiments can undergo other modifications and variants without departing from the scope of the invention.

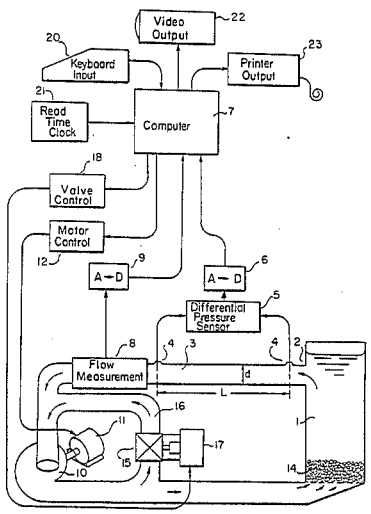

What is claimed is:

1. A gauge for checking the clearance existing between the cams of an engine camshaft and the associated valves, comprising:
   support means;
   drive means for rotating the camshaft;
   control means;
   gauging means including: a first measuring element movably coupled to the support means for undertaking, during rotation of the camshaft, positions responsive to the positions of a valve; a second measuring element movably coupled to the support means for contacting, during rotation of the camshaft, the surface of the cam associated with said valve; and a gauging device coupled to the first measuring element and the second measuring element for providing a signal indicative of the mutual position of said first measuring element and a second measuring element; and processing means connected to the gauging device for processing said signal during rotation of the camshaft and determining the amount of clearance between said valve and the associated cam; wherein the control means is coupled to the first measuring element for displacing it from a measurement position, where the first measuring element is arranged close at a side of said cam, to a rest position where the first measuring element is arranged apart from the path of displacement of said cam, during a part of the rotary movement of the cam.

2. The gauge according to claim 1, wherein said processing means process said signal for detecting two subsequent peak values and the difference of said peak values.

3. The gauge according to claim 2, wherein said control means include switch means operatively coupled to said first measuring element and second measuring element for providing control signals in correspondence to determined positions undertaken by the two measuring elements, for controlling said displacement of the first measuring element from the rest position to the measurement position and vice versa.

4. The gauge according to claim 3, wherein said switch means include unidirectional proximity switches.

5. The gauge according to claim 1, wherein said gauging device includes a first gauging head, with a movable stylus bearing said first measuring element and a second gauging head with a movable stylus carrying said second measuring element, the second gauging head being fixed to said support means, the support means including coupling means for movably supporting the first gauging head, and wherein the control means is coupled to the first gauging head for displacing it, with respect to the support means, from a first position, where the first measuring element is in said rest position, to a second position, where the first measuring element is in said measurement position and vice versa.

6. The gauge according to claim 5, wherein the first gauging head and the second gauging head provide electronic output signals and wherein said processing means include comparator circuits for detecting prefixed values of the output signals of the first and second gauging heads, the control means being connected to the comparator circuits for controlling the displacements of the first gauging head from the first to the second position and vice versa.

7. The gauge according to claim 1, wherein said control means include switch means for providing control signals in correspondence to prefixed positions undertaken by said first measuring element and second measuring element, the control means being connected to at least a further gauge arranged next to the measured location for detecting the amount of clearance existing between another cam and its associated valve, for controlling the functioning of the further gauge.

8. The gauge according to claim 1, wherein said gauging means include a first spindle axially movable with respect to said support means and bearing said second measuring element; a second spindle axially movable with respect to said support means and bearing said first measuring element, the first measuring element being arranged to contact a part of the valve facing the cam; and an electronic gauging head fixed to the first spindle and having a movable feeler element, for providing said signal indicative of the mutual position of said first measuring element and second measuring element; the support means including a slidable coupling device for movably supporting the second spindle and for permitting displacements of the second spindle and of the gauging head from a first position, where the first measuring element is in said measurement position and said movable feeler element axially contacts the first spindle, to a second position, where the first measuring element is in said rest position and the movable feeler element is arranged axially apart from the first spindle, and vice versa; the control means including members fixed to the support means, the first spindle and the second spindle, for providing control signals in correspondence to prefixed positions of the two spindles with respect to the support means, a control unit operatively connected to the second spindle for displacing said second spindle; the processing means including peak detecting circuits for determining at least two consecutive peak values of the signal and a circuit for subtracting said peak values from each other for determining the value of said clearance.

9. A gauge for checking the clearance existing between the cams of an overhead camshaft and the associated valves of an automobile engine having the overhead camshaft arranged for direct cooperation of the cams with bucket type tappets, comprising:
support means;
drive means for rotating the camshaft;
gauging means including: first measuring means including a measuring element movably coupled to the support means for undertaking, during rotation of the camshaft, positions responsive to the positions of a valve; and second measuring means for providing, during rotation of the camshaft, a signal indicative of the mutual positions of the valve and of the surface of the relevant cam; and control means coupled to the measuring element for controlling, depending on the angular position of the cam, the retraction of the measuring element from a measurement position where the measuring element is arranged close at a side of the cam, to a rest position, where the measuring element is arranged apart from the cam, thereby to prevent the tip of the cam from touching the measuring element during a first portion of the rotary movement of the cam.

10. The gauge according to claim 9, wherein the control means comprise actuation means for releasing the measuring element, depending on the angular position of the cam, from the rest position, to the measurement position.

11. The gauge according to claim 10, further comprising processing means connected to the second measuring means for processing said signal to provide the amount of clearance.

12. The gauge according to claim 11, for checking said clearance in an engine having valves with cups facing the cams of said camshaft, wherein said measuring element is movably coupled to the support means for contacting, during a second portion of the rotary movement of said cam, the cup of said valve.

13. The gauge according to claim 11, for checking said clearance in an engine having valves with cups housing shims, wherein said measuring element is movably coupled to the support means for contacting, during a second portion of the rotary movement of said cam, the shim housed in the cup of said valve.

* * * * *

United States Patent [19]

Characklis

[11] Patent Number: 4,521,864

[45] Date of Patent: Jun. 4, 1985

[54] MEASUREMENT OF BUILD-UP OF FOULING DEPOSITS BY SENSING FLOW CHARACTERISTICS DURING BRIEF FLOW EXCURSIONS

[76] Inventor: William G. Characklis, 516 W. Cleveland St., Bozeman, Mont. 59715

[21] Appl. No.: 429,254

[22] Filed: Sep. 30, 1982

[51] Int. Cl.³ .................. G01N 11/04; G01B 13/10
[52] U.S. Cl. .................................. 364/563; 73/61.2
[58] Field of Search .................. 364/509, 510, 563; 73/61 R, 61.2

[56] References Cited

U.S. PATENT DOCUMENTS

| | | | |
|---|---|---|---|
| 3,552,189 | 1/1971 | Courvoisier et al. | 73/61.2 |
| 4,059,744 | 11/1977 | Elderton | 364/510 X |
| 4,176,544 | 12/1979 | Eyles et al. | 73/61.2 |
| 4,247,899 | 1/1981 | Schiller et al. | 364/510 X |

*Primary Examiner*—Errol A. Krass
*Assistant Examiner*—Edward R. Cosimano
*Attorney, Agent, or Firm*—Eric P. Schellin

[57] ABSTRACT

A method and apparatus for measuring the thickness of film fouling in a hydraulic system. While the system is clean and unfouled, it is subjected to a brief test run during which the water velocity is swept over a wide range and the corresponding pressure drops are measured and recorded to provide a reference curve for the velocity-pressure drop characteristic. Later, when the system is fouled, the brief test run is repeated to arrive at a new reference curve, part of which substantially coincides with the said reference curve and part of which departs monotonically. The point of departure, by calculation, yields the thickness of the film fouling.

3 Claims, 4 Drawing Figures